(12) United States Patent
Gao et al.

(10) Patent No.: US 11,091,238 B2
(45) Date of Patent: Aug. 17, 2021

(54) LEG-ARM-PROPELLER UNDERWATER ROBOT

(71) Applicant: Harbin Institute of Technology, Haerbin (CN)

(72) Inventors: Haibo Gao, Haerbin (CN); Liang Ding, Haerbin (CN); Xiuwen Bi, Haerbin (CN); Yiqun Liu, Weihai (CN); Jingming Zhang, Weihai (CN); Liyuan Ge, Haerbin (CN); Zongquan Deng, Haerbin (CN); Haitao Yu, Haerbin (CN)

(73) Assignee: HARBIN INSTITUTE OF TECHNOLOGY, Haerbin (CN)

( * ) Notice: Subject to any disclaimer, the term of this patent is extended or adjusted under 35 U.S.C. 154(b) by 0 days.

(21) Appl. No.: 16/826,327

(22) Filed: Mar. 23, 2020

(65) Prior Publication Data
US 2020/0398958 A1   Dec. 24, 2020

(30) Foreign Application Priority Data
Jun. 18, 2019 (CN) .......................... 201910525493.3

(51) Int. Cl.
| | |
|---|---|
| B63C 11/52 | (2006.01) |
| B25J 15/02 | (2006.01) |
| B63G 8/00 | (2006.01) |
| B63G 8/08 | (2006.01) |
| B63G 8/14 | (2006.01) |

(52) U.S. Cl.
CPC ............ *B63C 11/52* (2013.01); *B25J 15/0253* (2013.01); *B63G 8/001* (2013.01); *B63G 8/08* (2013.01); *B63G 8/14* (2013.01); *B63G 2008/005* (2013.01)

(58) Field of Classification Search
CPC ...... B63C 11/00; B63C 11/52; B25J 15/0253; B63G 8/00; B63G 8/001; B63G 8/08; B63G 8/14; B63G 2008/005
USPC ......................................................... 114/313
See application file for complete search history.

(56) References Cited

U.S. PATENT DOCUMENTS

| | | | |
|---|---|---|---|
| 6,928,947 B1 * | 8/2005 | Clapham | ................. B63C 11/42 114/313 |
| 9,849,954 B1 * | 12/2017 | Jun | ........................ B63G 8/001 |

* cited by examiner

*Primary Examiner* — Lars A Olson

(57) ABSTRACT

A leg-arm-paddle underwater robot is provided in the present invention, which includes: a frame, an operating mechanism, a traveling mechanism, and a propulsion mechanism. The traveling mechanism is adapted to enable the leg-arm-paddle composite underwater robot to travel. The propulsion mechanism is adapted to enable the leg-arm-paddle composite underwater robot to float in water. The operating mechanism includes a first robot arm, a second robot arm, and a first mounting base, wherein the first mounting base is detachably connected to the frame. Both the first robot arm and the second robot arm are rotatably connected to the first mounting base, and rotation centers of the first robot arm and the second robot arm are the same. The operating mechanism of the leg-arm-paddle composite underwater robot has a compact structure and a large working range. The leg-arm-paddle composite underwater robot has reduced volume, enhanced operation capability, wide applicability, and strong practicability.

10 Claims, 8 Drawing Sheets

LEG-ARM-PROPELLER UNDERWATER ROBOT

BACKGROUND OF THE INVENTION

Field of the Invention

The present invention relates to the field of robots, in particular to a leg-arm-paddle composite underwater robot.

Description of Related Art

Underwater mobile robots are an important tool for ocean development, replacing humans to directly observe the ocean, investigate subsea geology, and extract resources. Some coastal-developed countries such as the United States, Japan, Canada, and the United Kingdom have been committed to the research and development of underwater mobile robot technology. The existing underwater mobile robots mainly include manned submersibles, underwater autonomous vehicles, remotely controlled underwater robots, and water gliding robots.

However, the existing underwater robots have complicated structures, large volumes, and poor operating capabilities and stabilities, which cannot meet the requirement for the development of modern technology.

SUMMARY OF THE INVENTION

The problem solved by the present invention is that, the existing underwater robots have complicated structures and poor operating capabilities.

In order to solve the above problem, a leg-arm-paddle composite underwater robot is provided in the present invention. The leg-arm-paddle composite underwater robot includes: a frame, an operating mechanism, a traveling mechanism, and a propulsion mechanism.

The traveling mechanism is adapted to enable the leg-arm-paddle composite underwater robot to travel. The propulsion mechanism is adapted to enable the leg-arm-paddle composite underwater robot to float in water.

The operating mechanism includes a first robot arm, a second robot arm, and a first mounting base, wherein the first mounting base is detachably connected to the frame. Both the first robot arm and the second robot arm are rotatably connected to the first mounting base, and rotation centers of the first robot arm and the second robot arm are the same.

Therefore, the rotation centers of the first robot arm and the second robot arm are the same so as to reduce mounting spaces for the first robot arm and the second robot arm. The operating mechanism has a compact structure and a large working range. The leg-arm-paddle composite underwater robot has reduced volume, enhanced operation capability, wide applicability, and strong practicability.

In one embodiment, the first robot arm includes a first base, the second robot arm includes a second base, both the first base and the second base are rotatably connected to the first mounting base, and rotation centers of the first base and the second base are the same.

Therefore, with rotation of the first base, the first robot arm may be rotated as a whole; with rotation of the second base, the second robot arm may be rotated as a whole; and with cooperative action of the first base and the second base, an adjustment for the relative position between the first robot arm and the second robot arm may be realized, so that the working range is large, the working capability is enhanced, and the practicability is strong.

In one embodiment, the first mounting base includes a first mounting shaft, the first base includes a first cylinder, an inner wall of the first cylinder is rotatably connected to the first mounting shaft, and the second base is rotatably connected to an outer wall of the first cylinder.

Therefore, the mounting structure for the first mounting base, the first base, and the second base is compact and has a large rotation range; the operating mechanism has a more compact structure, and the first robot arm and the second robot arm do not interfere with each other, so as to have a large operation range, strong operation capability, wide applicability and strong practicability.

In one embodiment, both the first robot arm and the second robot arm include a plurality of arms, and at least one of the plurality of arms of the first robot arm has the same rotation surface as the arm of the second robot ram so as to be suitable for realizing embracing operations.

Therefore, the cooperation of the first robot arm and the second robot arm can capture large-volume objects or creatures, and has a strong working ability, which is more in line with the operating requirements of underwater robots, has high reliability, and strong practicability.

In one embodiment, a clamping manipulator is disposed at one end of the first robot ram, and a cage manipulator is disposed at one end of the second robot arm.

Therefore, the cage manipulator may capture small-sized plankton, and the holding manipulator may grasp hard objects, such as mineral specimens, which is more in line with the requirements of underwater operations, and improves the applicability and strong practicability of the leg-arm-paddle composite underwater robot.

In one embodiment, the traveling mechanism includes a plurality of traveling foot, and the traveling foot include a first rotation base, a first leg, a second leg, a tenth driver, and an eleventh driver. Both the tenth driver and the eleventh driver are mounted on the first rotation base for being suitable for driving the first leg and the second leg.

Therefore, the tenth driver 315 and the eleventh driver are both mounted on the first rotating base, overloading for the first leg and the second leg is avoided, so that the traveling mechanism has a more compact structure, and a more flexible movement, thereby enhancing the applicability and practicality of the leg-arm-paddle composite underwater robot.

In one embodiment, the traveling foot further includes a first driving shaft, and both the first driving shaft and the first leg are rotatably connected to the first rotation base. The second leg is rotatably connected to one end of the first leg away from the first rotation base, the first driving shaft is connected to a rotation shaft of the second leg through a transmission assembly, and the eleventh driver controls rotation of the second leg by driving the first driving shaft.

Therefore, the eleventh driver may control the rotation of the second leg by driving the first driving shaft, with high controllability and practicality.

In one embodiment, rotation centers of the first driving shaft and the first leg are the same.

Therefore, rotation centers of the first driving shaft and the first leg are the same, so that the driving transmission structure between the second leg and the first leg is more compact, smaller in size, more flexible in movement, and has strong applicability and practicability.

In one embodiment, the propulsion mechanism includes at least eight spiral propellers; wherein at least four of the spiral propellers are disposed obliquely in a propelling direction, and at least four of the spiral propellers are disposed obliquely in a direction opposite to the propelling direction, the propelling direction including an upward direction, a downward direction, a leftward direction, a rightward direction, a forward direction, and a backward direction.

Therefore, the operation of the leg-arm-paddle composite underwater robot is more flexible and stable by the cooperation of multiple spiral propellers.

In one embodiment, the first leg is provided with a third receiving portion for being suitable for receiving the second leg.

Therefore, the first leg can accommodate the second leg, the structure of the traveling foot is more compact, and the leg-arm-paddle composite underwater robot has a smaller volume, and its operation is more flexible and stable.

In one embodiment, the frame is provided with a first receiving portion and a second receiving portion; the first receiving portion is suitable for receiving the operating mechanism; and the second receiving portion is suitable for receiving the traveling mechanism.

Therefore, the structure of the leg-arm-paddle composite underwater robot is more compact, the floating resistance of the leg-arm-paddle composite underwater robot is reduced, and the applicability and practicability are enhanced.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE PREFERRED EMBODIMENTS

To enable the above objects, features and advantages of the present invention to be more apparent and easily understood, the specific embodiments of the present invention will be further elaborated hereafter in connection with the drawings.

Figure 1:
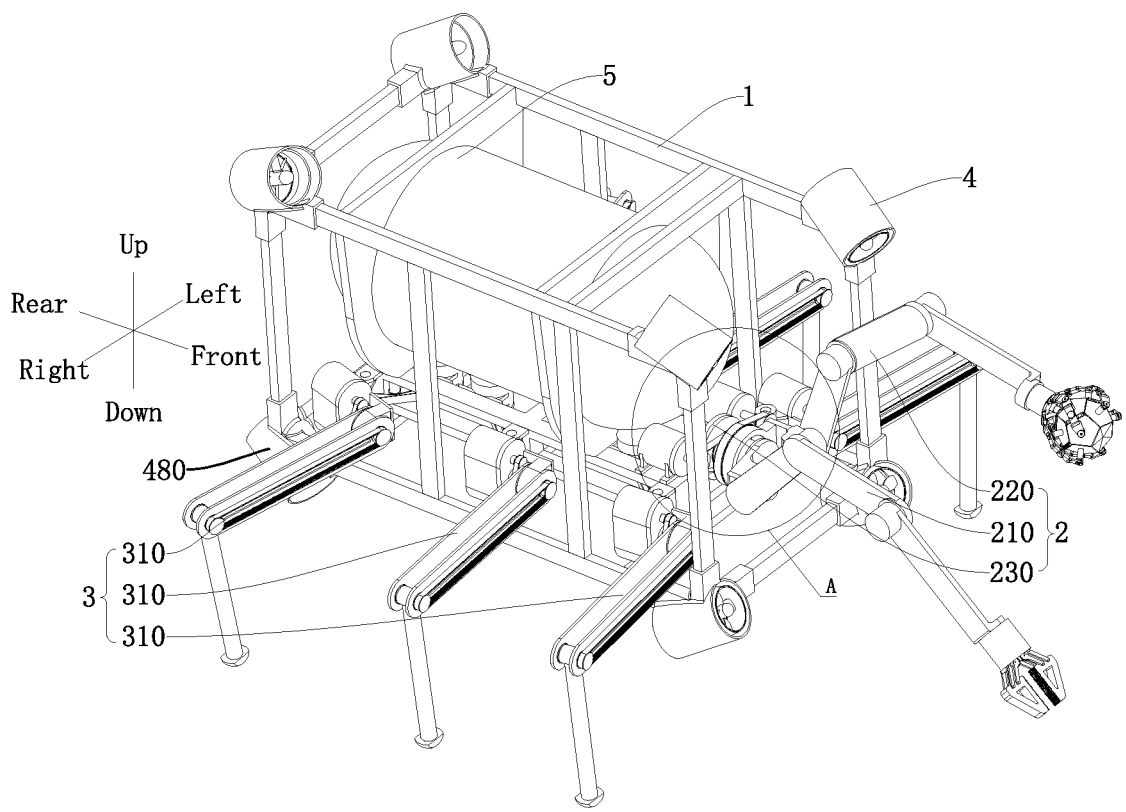
FIG. 1 is a structural diagram of a leg-arm-paddle composite underwater robot according to an embodiment of the present invention.
Figure 2:
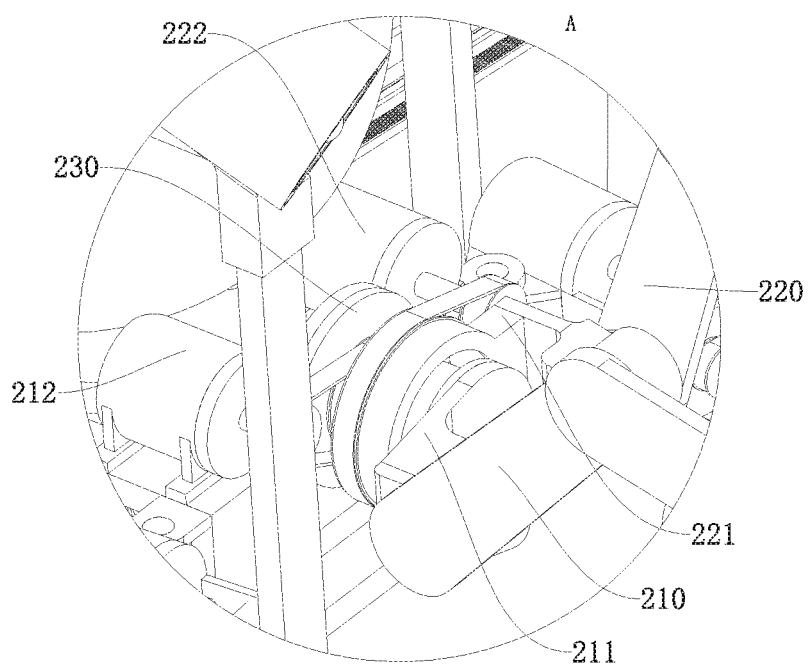
FIG. 2 is a partially-enlarged view at a location A in FIG. 1.

With reference to FIGS. 1 and 2, FIG. 1 is a structural diagram of a leg-arm-paddle composite underwater robot according to an embodiment of the present invention, and FIG. 2 is an enlarged view of the location A in FIG. 1. The leg-arm-paddle composite underwater robot includes a frame 1, an operating mechanism 2, a traveling mechanism 3 and a propulsion mechanism 4.

The traveling mechanism 3 is adapted to enable the leg-arm-paddle composite underwater robot to travel.

The propulsion mechanism 4 is adapted to enable the leg-arm-paddle composite underwater robot to float in water.

The operating mechanism 2 includes a first robot arm 210, a second robot arm 220, and a first mounting base 230, wherein the first mounting base 230 is detachably connected to the frame 1, both the first robot arm 210 and the second robot arm 220 are rotatably connected to the first mounting base 230, and rotation centers of the first robot arm 210 and the second robot arm 220 are the same.

Specifically, the traveling mechanism 3, the propulsion mechanism 4 and the operating mechanism 2 are all mounted on the frame 1, the traveling mechanism 3 includes a plurality of traveling foot 310 with multiple degrees of freedom, and the propulsion mechanism 4 includes a plurality of spiral propellers.

In some embodiments, the operating mechanism 2 is provided at a front end of the leg-arm-paddle composite underwater robot; rotation centers of the first robot arm 210 and the second robot arm 220 are the same, and are first rotation center line L1; the first robot arm 210 further includes a first driving assembly 212, and the second robot arm 220 further includes a second driving assembly 222, wherein the first driving assembly 212 is adapted to drive the first robot arm 210 as a whole to rotate about the first rotation center line L1, and the second driving assembly 222 is adapted to drive the second robot arm 220 as a whole to rotate about the first rotation center line L.

It should be understood that due to the complicated working environment in water, the requirements for the leg-arm-paddle composite underwater robot are higher than ordinary robots, and its structure should be more compact.

Therefore, the rotation centers of the first robot arm 210 and the second robot arm 220 are the same so as to reduce mounting spaces for the first robot arm 210 and the second robot arm 220. The operating mechanism 2 has a compact structure and a large working range. The leg-arm-paddle composite underwater robot has reduced volume, enhanced operation capability, wide applicability, and strong practicability.

In some embodiments, the first robot arm 210 includes a first base 211, the second robot arm 220 includes a second base 221, both the first base 211 and the second base 221 are rotatably connected to the first mounting base 230, and rotation centers of the first base 211 and the second base 221 are the same.

Specifically, the first base 211 is a fixed end of the first robot arm 210, and the second base 221 is a fixed end of the second robot arm 220.

Thus, with rotation of the first base 211, the first robot arm 210 may be rotated as a whole; with rotation of the second base 221, the second robot arm 220 may be rotated as a whole; and with cooperative action of the first base 211 and the second base 221, an adjustment for the relative position between the first robot arm 210 and the second robot arm 220 may be realized, so that the working range is large, the working capability is enhanced, and the practicability is strong.

Figure 3:
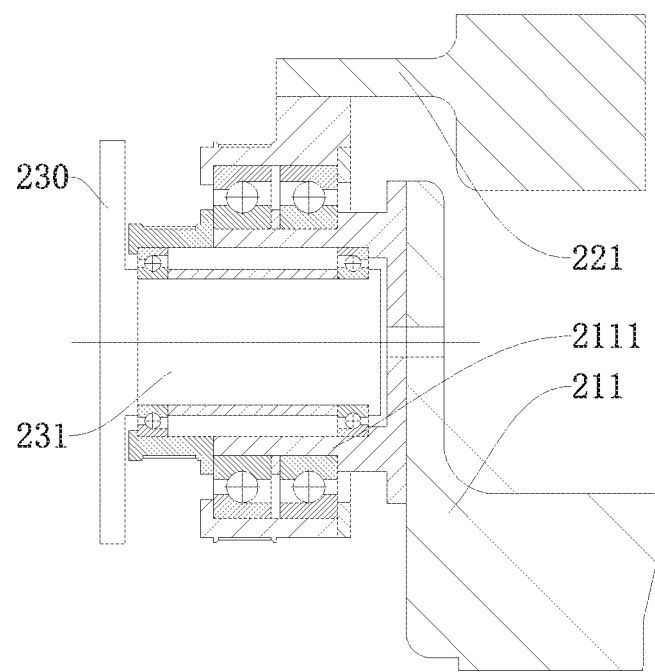
FIG. 3 is a structural diagram of an embodiment of a mounting base of the leg-arm-paddle composite underwater robot in the present invention.
Figure 4:
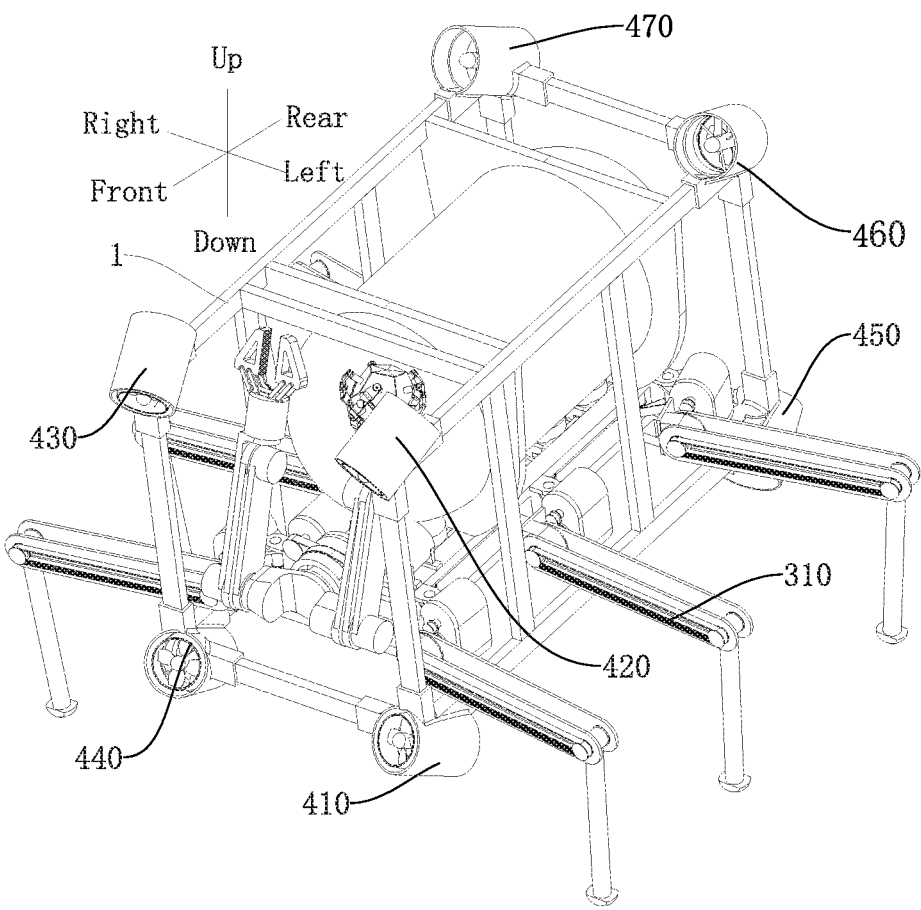
FIG. 4 is a structural diagram of a leg-arm-paddle composite underwater robot according to an embodiment of the present invention.

Specifically, with reference to FIG. 3, FIG. 3 is a view showing a structure of a mounting base of an embodiment of the leg-arm-paddle composite underwater robot. In some embodiments, the first mounting base 230 includes a first mounting shaft 231, the first base 211 includes a first cylinder 2111, an inner wall of the first cylinder 2111 is rotatably connected to the first mounting shaft 231, and the second base 221 is rotatably connected to an outer wall of the first cylinder 2111.

In some other embodiments, arrangement may be that the second base 221 includes a second cylinder, an inner wall of the second cylinder is rotatably connected to the first mounting shaft 231, and the first base 211 is rotatably mounted to an outer wall of the first cylinder 2111. It should be understood that the structure of the rotational connection among the first mounting base 230, the first base 211, and the second base 221 is not limited to the above embodiment, and may be flexibly changed.

Specifically, in the this embodiment, the first cylinder 2111 is rotatably connected to the first mounting shaft 231 through a bearing or a self-lubricating bearing, and the second base 221 is rotatably connected to the first cylinder 2111 through the bearing or the self-lubricating bearing.

Thus, the mounting structure for the first mounting base 230, the first base 211, and the second base 221 is compact and has a large rotation range; the operating mechanism 2 has a more compact structure, and the first robot arm 210 and the second robot arm 220 do not interfere with each other, so as to have a large operation range, strong operation capability, wide applicability and strong practicability.

Figure 6:
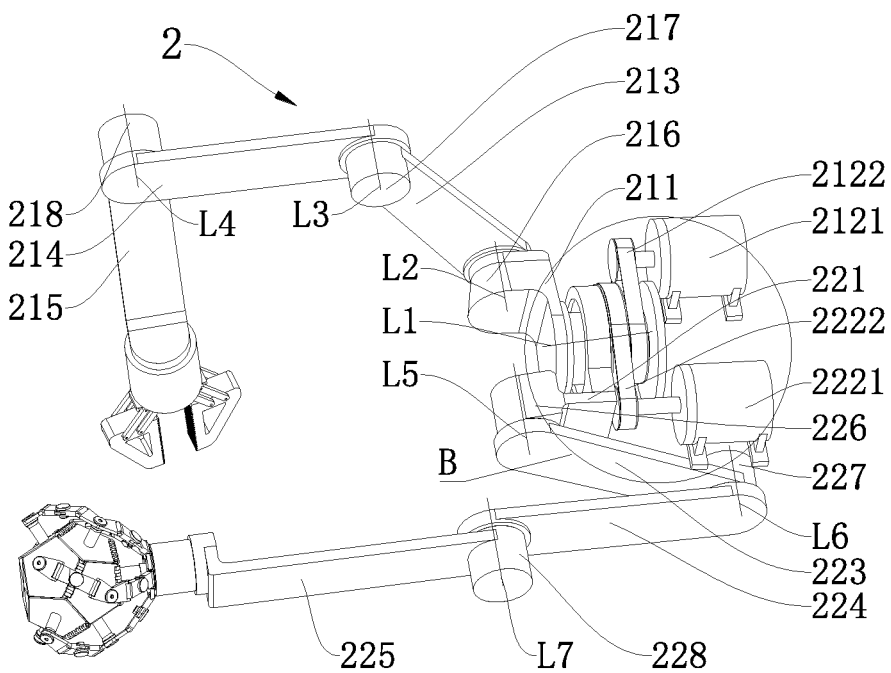
FIG. 6 is a structural diagram of an embodiment of an operating mechanism of the leg-arm-paddle composite underwater robot in the present invention.
Figure 7:
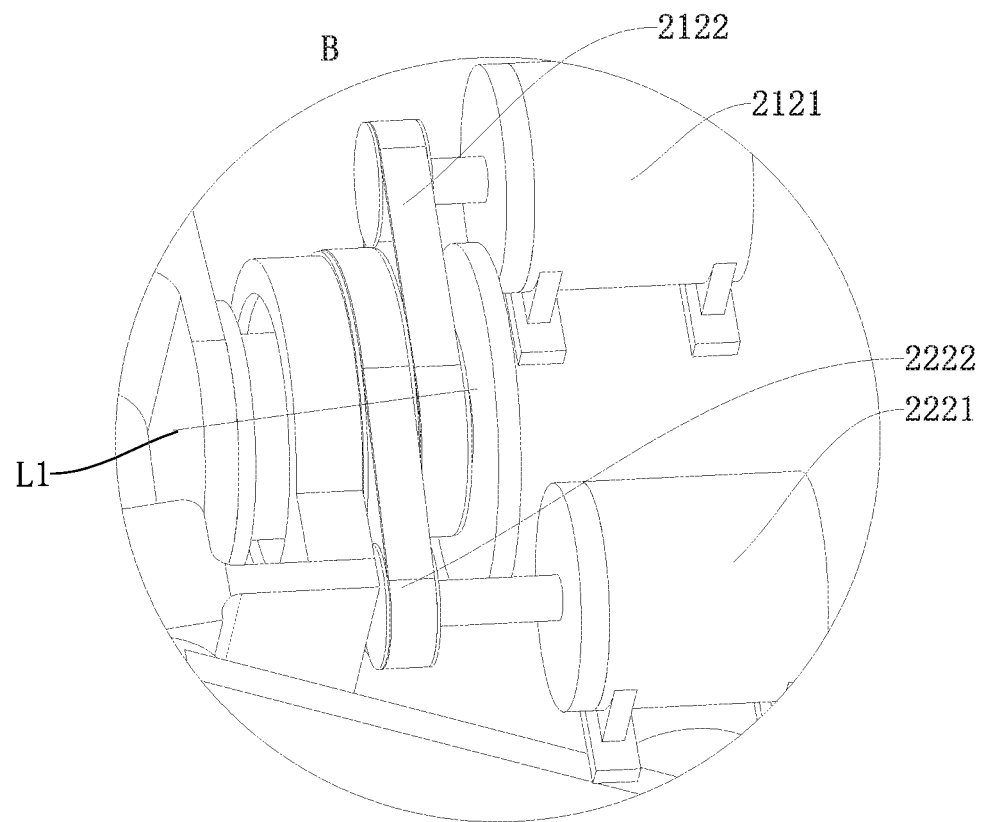
FIG. 7 is a partially-enlarged view at a location B in FIG. 6.
Figure 8:
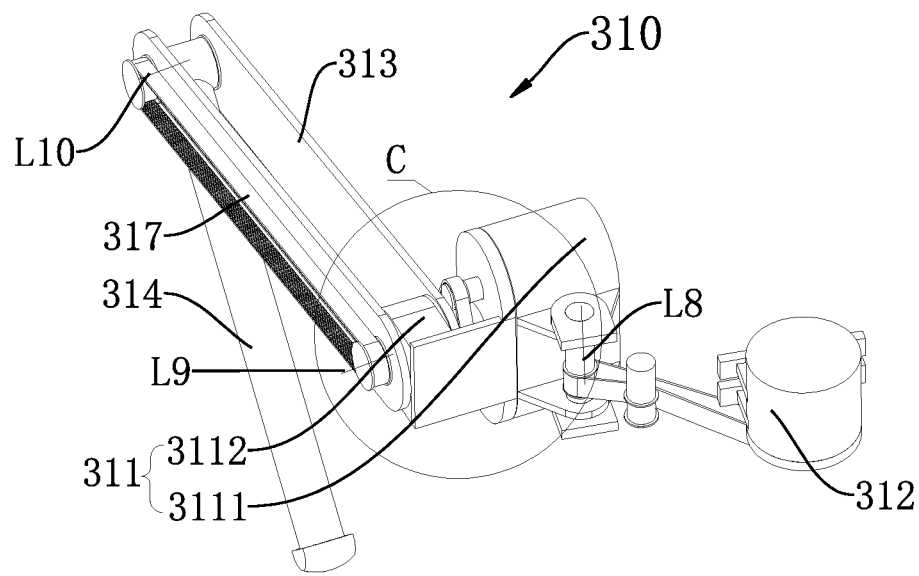
FIG. 8 is a structural diagram of an embodiment of traveling foot of the leg-arm-paddle composite underwater robot in the present invention.
Figure 9:
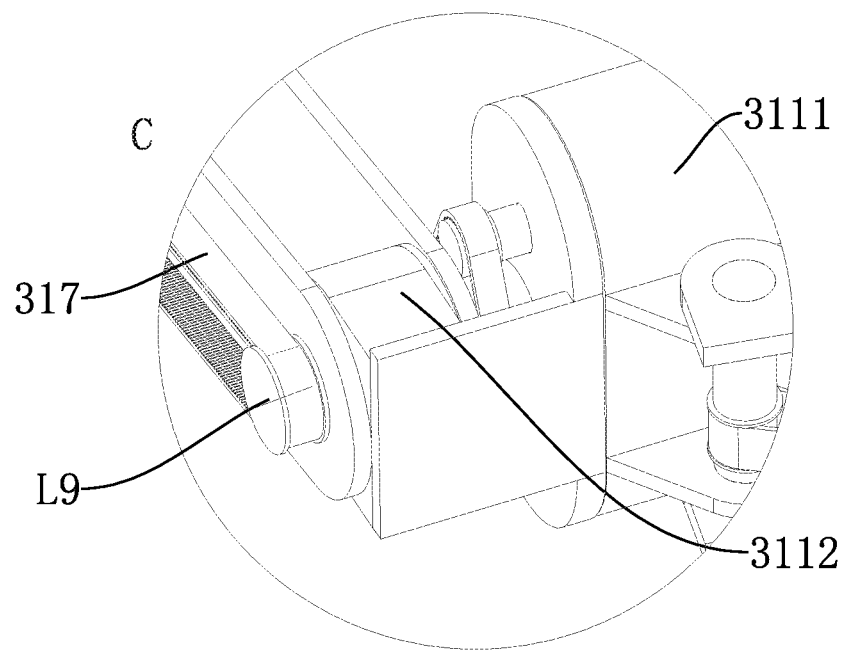
FIG. 9 is a partially-enlarged view at a location C in FIG. 8.
Figure 10:
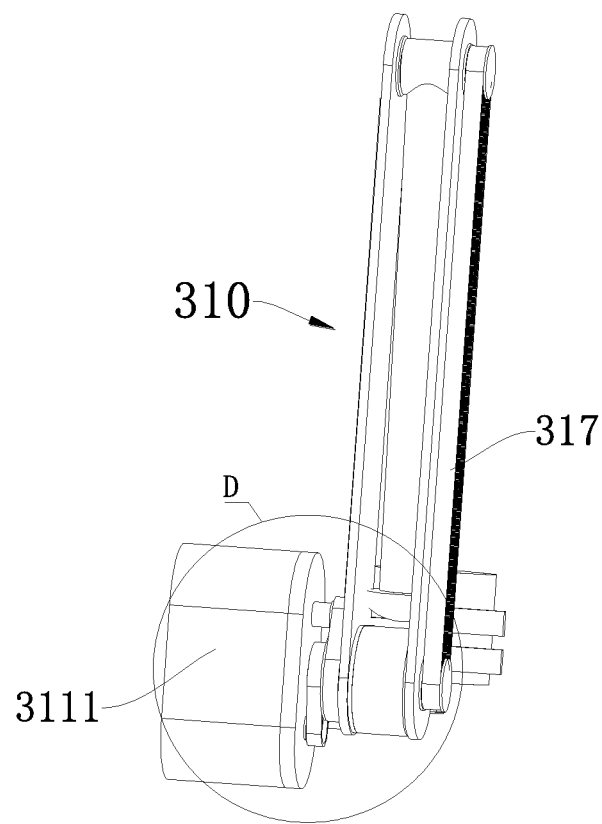
FIG. 10 is a structural diagram of an embodiment of traveling foot of the leg-arm-paddle composite underwater robot in the present invention.
Figure 11:
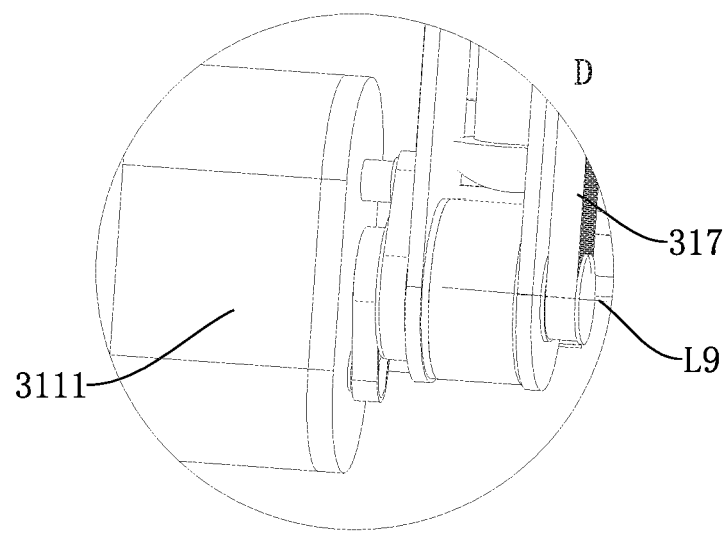
FIG. 11 is a partially-enlarged view at a location D in FIG. 10.

Specifically, with reference to FIGS. 6 and 7, FIG. 6 is a view showing a structure of an operating mechanism of an embodiment of the leg-arm-paddle composite underwater robot, and FIG. 7 is an enlarged view of B in FIG. 6; the first driving assembly 212 is adapted to drive the first base 211 to rotate around the first rotation center line L1, and the second driving component 222 is adapted to drive the second base 221 to rotate around the first rotation center line L1.

In some embodiments, the first driving assembly 212 includes a first driver 2121 and a first pulley set 2122, wherein the first driver 2121 is fixedly mounted on the first mounting base 230, and the first driver 2121 drives the first base 211 to rotate around the first rotation center line L1 through the first pulley set 2122; the first pulley set 2122 includes two pulleys, one of which is fixedly connected to an output shaft of the first driver 2121, and the other is fixedly mounted on the first base 211 while being integrally disposed with the first base 211 in some embodiments and being fixedly mounted to a side wall of the first base 211 in some other embodiments; the second driving assembly 222 includes a second driver 2221 and a second pulley set 2222, wherein the second driver 2221 is fixedly mounted on the first mounting base 230, and the second driver 2221 drives the second base 221 to rotate around the first rotation center line L1 through the second pulley set 2222.

The first mounting base 230 may be detachably connected to the frame 1, so that the operating mechanism 2 may be mounted to the frame 1 after being mounted as a whole for facilitating mounting and conditioning as a whole, and in this way, the mounting space is small, the structure is compact and the practicality is strong.

Specifically, both the first robot arm 210 and the second robot arm 220 comprise a plurality of arms, and at least one of the plurality of arms of the first robot arm 210 has the same rotation surface as the arm of the second robot ram 220 so as to be suitable for realizing embracing operations.

With reference to FIGS. 6, 7, 14 and 15, specifically, in some embodiments, the first robot arm 210 further includes a first arm 213, a second arm 214, a third arm 215, a third driver 216, a fourth driver 217 and a fifth driver 218, wherein an end of the first arm 213 is rotatably connected to the first base 211 with a rotation center as a second rotation center line L2; the second arm 214 has one end rotatably connected to an end of the first arm 213 away from the first base 211 with a rotation center as a third rotation center line L3, and the other end rotatably connected to the third arm 215 with a rotation center as a fourth rotation center line L4; in the this embodiment, the second rotation center line L2, the third rotation center line L3 and the fourth rotation center line L4 are disposed parallel to each other, and perpendicular to the first rotation center line L1; the third driver 216 is mounted on the first base 211 for being suitable for driving the first arm 213 to rotate around the second rotation center line L2, the fourth driver 217 is mounted on the first arm 213 for being suitable for driving the second arm 214 to rotate around the third rotation center line L3, and the fifth driver 218 is mounted on the third arm 215 for being suitable for driving the third arm 215 to rotate around the fourth rotation center line L4.

It should be understood that in order to realize foldability of the first robot arm 210, in the this embodiment, the first arm 213, the second arm 214, and the third arm 215 are all configured as a plate structure; the second arm 214 is disposed on a side of the first arm 213 opposite to the first base 211, the fourth driver 217 is disposed on the same side of the first arm 213 as the first base 211, and both the third arm 215 and the fifth driver 218 are disposed on a side of the second arm 214 opposite to the fourth driver 217; the length of the third arm 215 is slightly larger than the length of the second arm 214, so that the first robot arm 210 may be folded, the volume is greatly reduced, and the applicability is wide. It should be noted that the first robot arm 210 may be folded in other manners.

The second robot arm 220 further includes a fourth arm 223, a fifth arm 224, a sixth arm 225, a sixth driver 226, a seventh driver 227 and an eighth driver 228, and an end of the fourth arm 223 is rotatably connected to the second base 221 with a rotation center as a fifth rotation center line L5; the fifth arm 224 has one end rotatably connected to an end of the fourth arm 223 away from the second base 221 with a rotation center as a sixth rotation center line L6, and the other end rotatably connected to the sixth arm 225 with a rotation center as a seventh rotation center line L7; in the this embodiment, the fifth rotation center line L5, the sixth rotation center line L6, and the seventh rotation center line L7 are disposed parallel to each other, and are perpendicular to the first rotation center line L; the sixth driver 226 is mounted on the second base 221 for being suitable for driving the fourth arm 223 to rotate around the fifth rotation center line L5, the seventh driver 227 is mounted on the fourth arm 223 for being suitable for driving the fifth arm 224 to rotate around the sixth rotation center line L6, and the eighth driver 228 is mounted on the sixth arm 225 for being suitable for driving the sixth arm 225 to rotate around the seventh rotation center line L7. It should be understood that in order to realize foldability of the second robot arm 220, in the this embodiment, the fourth arm 223, the fifth arm 224, and the sixth arm 225 are all configured as a plate structure; the fifth arm 224 is disposed on a side of the fourth arm 223 opposite to the second base 221, the seventh driver 227 is disposed on the same side of the fourth arm 223 as the second base 221, and both the sixth arm 225 and the eighth driver 228 are disposed on a side of the fifth arm 224 opposite to the seventh driver 227; the length of the sixth arm 225 is slightly larger than the length of the fifth arm 224, so that the second robot arm 220 may be folded, the volume is greatly reduced, and the applicability is wide. It should be noted that the second robot arm 220 may be folded in other manners.

Figure 14:
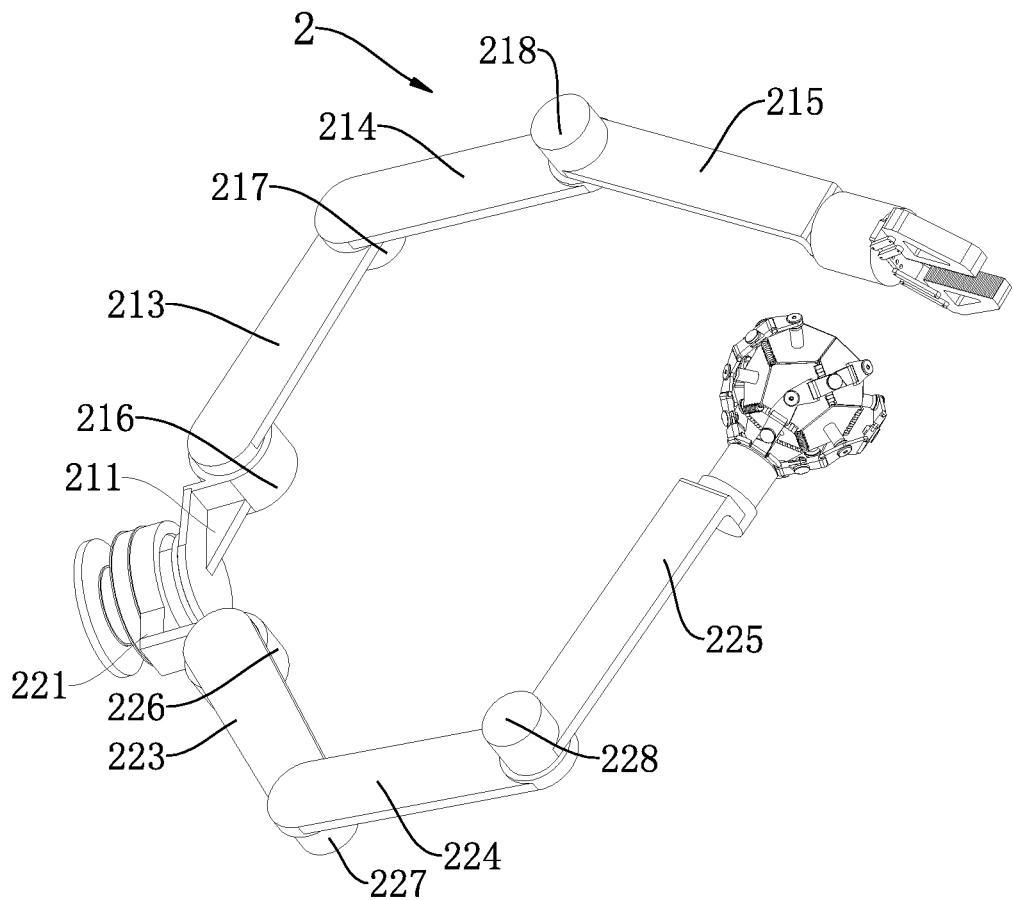
FIG. 14 is a structural diagram of an embodiment of an operating mechanism of the leg-arm-paddle composite underwater robot in the present invention.
Figure 15:
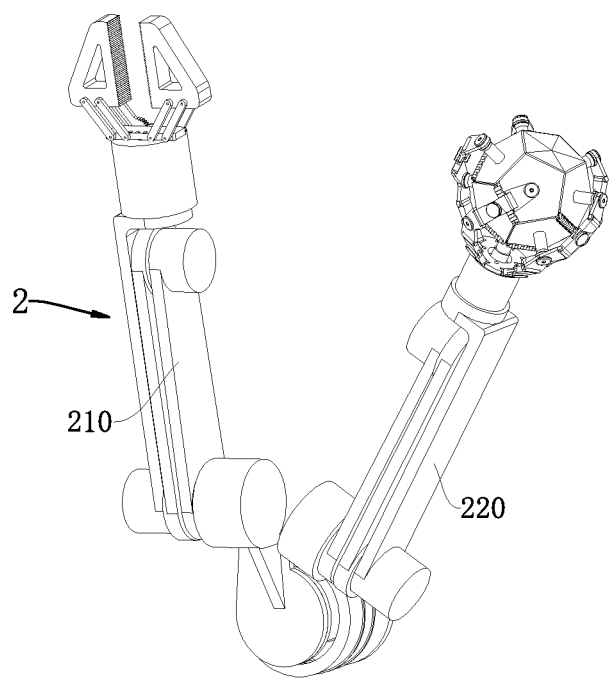
FIG. 15 is a structural view of another state of the operating mechanism.

Specifically, in some embodiments, as shown in FIGS. 14 and 15, through configuration on the structures of the first base 211 and the second base 221, the rotation surfaces of the first arm 213 and the fourth arm 223 are coplanar when the relative positions between the first base 211 and the second base 221 are constant; then, the rotation of an object to be gripped caused by the non-coplanarity of the force may be avoided, and the first arm 213 and the fourth arm 223 cooperate to capture large-volume items or creatures. It should be understood that when there are more coplanar rotation surfaces, the embracing range of the operating mechanism 2 is stronger.

Therefore, the cooperation of the first arm 213 and the fourth arm 223 may capture large-volume items or creatures, and has a strong working ability, which is more in line with the operating requirements of underwater robots, has high reliability and strong practicality.

A clamping manipulator is disposed at one end of the first robot ram 210, and a cage manipulator is disposed at one end of the second robot arm 220.

It should be understood that the end of the first robot arm 210 is a first end away from the first mounting base 230, i.e., an end of the third arm 215 away from the second arm 214, and the end of the second robot arm 220 is an end away from the first mounting base 230, i.e., an end of the sixth arm 225 away from the fifth arm 224.

Therefore, the cage manipulator may capture small-sized plankton, and the holding manipulator may grasp hard objects, such as mineral specimens, which is more in line with the requirements of underwater operations, and improves the applicability and strong practicality of the leg-arm-paddle composite underwater robot.

In some embodiments, the frame 1 is provided with a first receiving portion, and the first receiving portion is adapted to receive the operating mechanism 2.

Specifically, in a floating state, the first robot arm 210 and the second robot arm 220 are built into the first receiving portion in a folded manner.

Figure 5:
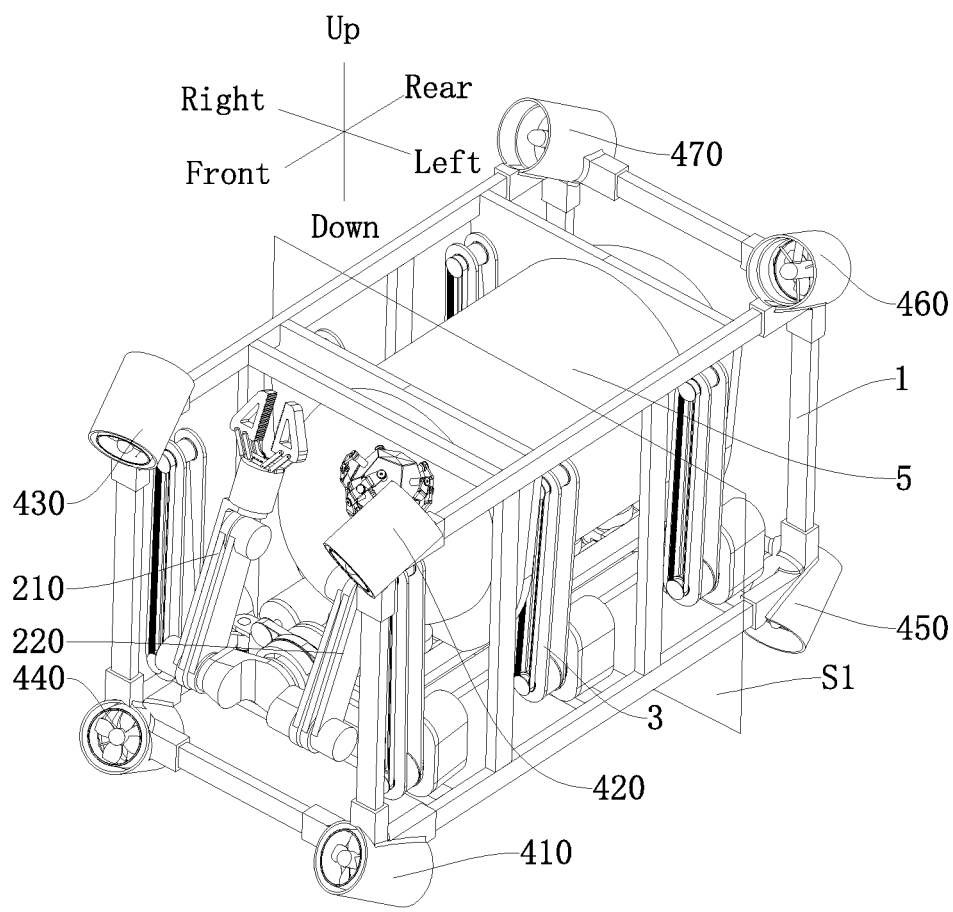
FIG. 5 is a structural diagram of a leg-arm-paddle composite underwater robot according to an embodiment of the present invention.

With reference to FIG. 5, specifically, the frame 1 is provided with a first receiving portion, so that the first robot arm 210 and the second robot arm 220 may be built into the first receiving portion in a folded manner.

Thus, when the leg-arm-paddle composite underwater robot is in a floating movement, both the first robot arm 210 and the second robot arm 220 may be folded and stored in the first receiving space of the frame 1, so that a volume of the operating mechanism 2 is greatly reduced, which greatly reduces the resistance of the leg-arm-paddle composite underwater robot in water, and the first robot arm 210 and the second robot arm 220 are prevented from being entangled by weeds or foreign bodies in the water to a certain extent, thereby having strong workability, high reliability, and strong practicality.

It should be understood that when the leg-arm-paddle composite underwater robot is in a floating movement, both the first robot arm 210 and the second robot arm 220 may extend out of the frame 1 as required to perform operations in the floating state.

The traveling mechanism 3 includes a plurality of traveling foot 310, and the traveling foot 310 comprise a first rotation base 311, a first leg 313, a second leg 314, a tenth driver 315, and an eleventh driver 316; both the tenth driver 315 and the eleventh driver 316 are mounted on the first rotation base 311 for being suitable for driving the first leg 313 and the second leg 314.

Specifically, with reference to FIG. 8 to FIG. 12, in some embodiments, the traveling foot 310 is provided as six foot, and the leg-arm-paddle composite underwater robot is provided with three traveling feet 310 on the left and right sides. It should be understood that the traveling foot 310 may also be provided as other number.

The eighth rotation center line L8 is vertically disposed, the ninth driver 312 is fixedly mounted on the frame 1, and the ninth driver 312 drives the first rotation base 311 to rotate forward and backward through a belt transmission. The traveling foot 310 further includes a tensioning wheel, and the tensioning wheel is adapted to adjust a tightness of a belt in the belt transmission.

The first rotation base 311 includes a second mounting base 3112, an end of the first leg 313 is rotatably connected to the second mounting base 3112 with a rotation center as a ninth rotation center line L9, and the tenth driver 315 drives the first leg 313 to rotate around the ninth rotation center line L9 through a belt transmission; the second leg 314 is rotatably connected to the other end of the first leg 313 with a rotation center as a tenth rotation center line L10, and the eleventh driver 316 drives the second leg 314 to rotate around the tenth rotation center line L10 through a belt transmission. It should be understood that in some embodiments, the ninth rotation center line L9 and the tenth rotation center line L10 are parallel to each other and perpendicular to the eighth rotation center line L8, so that the ninth driver 312 realizes the back-and-forth swing of the traveling mechanism, and the tenth driver 315 and the eleventh driver 316 cooperate to realize a "leg raising" action. In the this embodiment, the first rotation base 311 further includes a driver box 3111, and the tenth driver 315 and the eleventh driver 316 are both mounted in the driver box 3111. In this way, the tenth driver 315 and the eleventh driver 316 are both mounted on the first rotating base 311, and then drive the first leg 313 and the second leg 314 to rotate through a belt transmission, avoiding overloading the end of the first leg 313 near the second leg 314, so that the traveling mechanism 3 has a more compact structure, and a more flexible movement, thereby enhancing the applicability and practicality of the leg-arm-paddle composite underwater robot.

Therefore, the tenth driver 315 and the eleventh driver 316 are both mounted on the first rotating base 311, overloading for the first leg 313 and the second leg 314 is avoided, so that the traveling mechanism has a more compact structure, and a more flexible movement, thereby enhancing the applicability and practicality of the leg-arm-paddle composite underwater robot.

Figure 12:
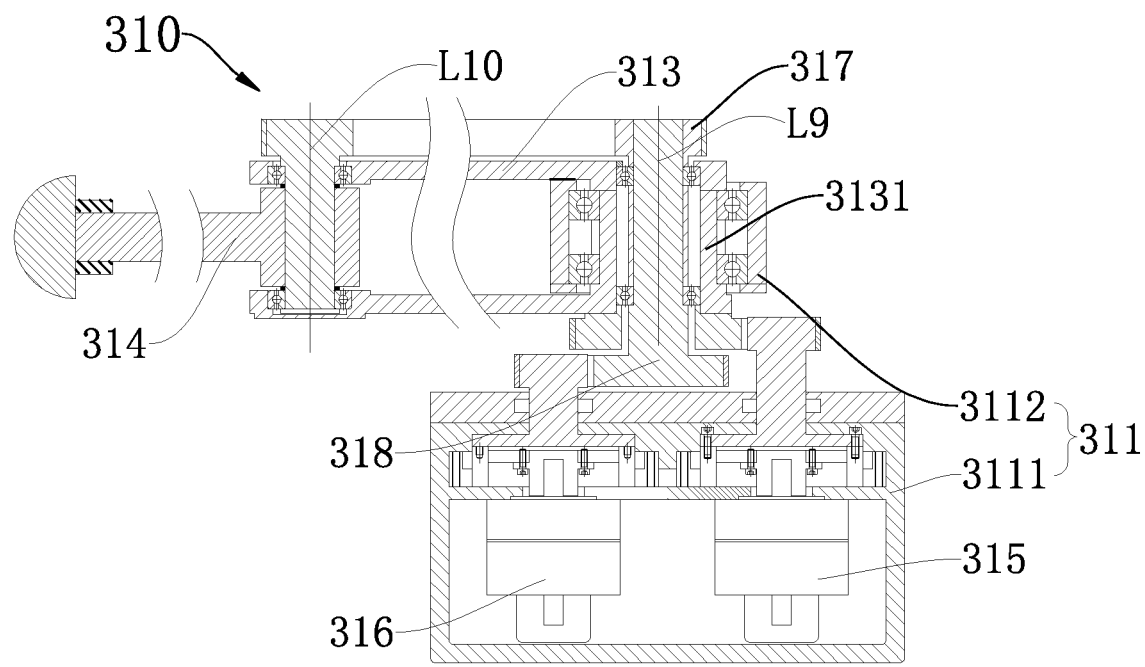
FIG. 12 is a sectional structural view of an embodiment of traveling foot of the leg-arm-paddle composite underwater robot in the present invention.

With reference to FIG. 12, the traveling foot 310 further include a first driving shaft 318, and both the first driving shaft 318 and the first leg 313 are rotatably connected to the first rotation base 311; the second leg 314 is rotatably connected to an end of the first leg 313 away from the first rotation base 311, the first driving shaft 318 is connected to a rotation shaft of the second leg 314 through a transmission assembly 317, and the eleventh driver 316 controls rotation of the second leg 314 by driving the first driving shaft 318.

With reference to FIG. 12, specifically, in some embodiments, the first leg 313 further includes a third cylinder 3131, and both the first driving shaft 318 and the third cylinder 3131 are rotatably connected to the second mounting base 3112; an outer wall of the third cylinder 3131 is rotatably connected to the second mounting base 3112 through a bearing, and the first driving shaft 318 is rotatably connected to an inner wall of the third cylinder 3131 through a bearing; a pulley is mounted on an end of the first driving shaft 318 away from the eleventh driver 316, and another pulley is mounted on a rotation shaft of the second leg 314, the two pulleys being connected to each other through a conveyor belt; the eleventh driver 316 drives the first driving shaft 318 to rotate through a belt transmission, and the first driving shaft 318 drives the second leg 314 to rotate through a belt transmission. It should be understood that in the this embodiment, an axis of an output shaft of the tenth driver 315, an axis of an output shaft of the tenth driver 315, and an axis of the first main shaft are disposed parallel to each other, and preferably are disposed to be coplanar.

Thus, the eleventh driver 316 may control the rotation of the second leg 314 by driving the first driving shaft 318, with high controllability and practicality.

Rotation centers of the first driving shaft 318 and the first leg 313 are the same.

Therefore, rotation centers of the first driving shaft 318 and the first leg 313 are the same, so that the driving transmission structure between the second leg 314 and the first leg 313 is more compact, smaller in size, more flexible in movement, and has strong applicability and practicability.

Specifically, in some embodiments, a pad is fixedly connected to an end of the second leg 314 away from the first main shaft, and a lower end of the pad is a curved surface, specifically a spherical surface. In this way, when traveling underwater, the curved surface structure enables the second leg 314 to be in good contact with the bottom wall of the water, which is suitable for various terrain environments, and has enhanced applicability and practicability.

In some embodiments, the frame 1 is provided with a second receiving portion, and the second receiving portion is adapted to receive the traveling mechanism 3.

Specifically, the frame 1 is provided with the second receiving portion for receiving the traveling foot 310, so that the first leg 313 is received in the second receiving portion through rotation of the first leg 313 driven by the tenth driver 315, and the second leg 314 is received in the second receiving portion through rotation of the second leg 314 driven by the eleventh driver 316. In this way, the traveling foot 310 may be folded in the frame 1, so as to have low resistance to floating movement in water, and have strong practicability.

As a result, the leg-arm-paddle composite underwater robot has a more compact structure, and reduced resistance, with enhanced adaptability and practicality.

The first leg 313 is provided with a third receiving portion, so that the second 314 is built into the third receiving portion when the traveling foot 310 is folded.

Specifically, in some embodiments, the first leg 313 includes two splints, the two splints are fixedly mounted at both ends of the third cylinder 3131, respectively, and the third receiving portion is formed between the two splints. Through rotation of the second leg 314 driven by the eleventh driver 316, the second leg 314 may be received in the third receiving portion.

Thus, through rotation of the second leg 314 driven by the eleventh driver 316, the second leg 314 is received in the second receiving space, so that the traveling foot 310 has a more compact structure and a smaller volume when folded, and the leg-arm-paddle composite underwater robot is smaller in size and more flexible and stable in operation.

The propulsion mechanism 4 includes at least eight spiral propellers, wherein at least four of the spiral propellers are disposed obliquely in a propelling direction, and at least four of the spiral propellers are disposed obliquely in a direction opposite to the propelling direction, the propelling direction including an upward direction, a downward direction, a leftward direction, a rightward direction, a forward direction, and a backward direction.

Specifically, in some embodiments, the propulsion 4 includes at least eight spiral propellers, wherein the eight spiral propellers are respectively located on eight vertices of the cuboid, and are disposed symmetrically with respect to a symmetry plane S1 of the cuboid; rotation center lines of the four spiral propellers located on one side of the symmetry plane S1 are at a first preset angle with the symmetry plane S1 and intersect at a first point therewith; a thrust of the four spiral propellers all point/depart from the first point.

Specifically, one end of the cuboid is a front end, and the other end of the cuboid is a rear end, and the spiral propellers located at the front and rear ends of the cuboid are disposed symmetrically about the symmetry plane S. The four propellers at one end of the cuboid are a front-left-lower propeller thruster 410, a front-left-upper propeller thruster 420, a front-right-upper propeller thruster 430, and a front-right-lower propeller thruster 440, respectively, wherein propeller rotation center lines of the front-left-lower propeller thruster 410, the front-left-upper propeller thruster 420, the front-right-upper propeller thruster 430 and the front-right-lower propeller thruster 440 are at a first preset angle with the front end surface and intersect at a first point therewith. In some embodiments, thrusts generated by the front-left-lower propeller thruster 410, the front-left-upper propeller thruster 420, the front-right-upper propeller thruster 430 and the front-right-lower propeller thruster 440 all point/depart from the first point. The four propellers at the other end of the cuboid are a rear-left-lower propeller thruster 450, a rear-left-upper propeller thruster 460, a rear-right-upper propeller thruster 470, and a rear-right-lower propeller thruster 480, respectively, wherein propeller rotation center lines of the rear-left-lower propeller thruster 450, the rear-left-upper propeller thruster 460, the rear-right-upper propeller thruster 470 and the rear-right-lower propeller thruster 480 are at a first preset angle with the front end surface and intersect at a second point therewith. In some embodiments, thrusts generated by the rear-left-lower propeller thruster 450, the rear-left-upper propeller thruster 460, the rear-right-upper propeller thruster 470 and the rear-right-lower propeller thruster 480 all point/depart from the second point.

Specifically, in the above embodiments, the first preset angle is preferably 45°, and is set to 45°, so that when a plurality of spiral propellers are required to cooperate, the resulting combined force will not be too small or too large, so as to meet the use requirements. It should be understood that when the thrusts generated by four spiral propellers at the front end are deviated from the first point, the thrusts generated by four spiral propellers at the rear end all point to the second point; when the thrusts generated by four spiral propellers at the front end all point to the first point, the thrusts generated by four spiral propellers at the rear end all point to the second point. In this embodiment, the thrusts generated by four spiral propellers at the front end all point to the first point, and the thrusts generated by four spiral propellers at the rear end all point to the second point.

In the this embodiment, when the front left lower propeller 410, the front left upper propeller 420, the front right upper propeller 430 and the front right lower propeller 440 generate the same thrust, a backward movement of the leg-arm-paddle composite underwater robot in front-rear direction may be realized; when the rear left lower propeller 450, the rear left upper propeller 460, the rear right upper propeller 470 and the rear right lower propeller 480 generate the same thrust, a forward movement of the leg-arm-paddle composite underwater robot in front-rear direction may be realized; when the front left upper propeller 420, the front right upper propeller 430, the rear left upper propeller 460 and the rear right upper propeller 470 generate the same thrust, a floating movement of the leg-arm-paddle composite underwater robot in front-rear direction may be realized; when the front left lower propeller 410, the front right lower propeller 440, the rear left lower propeller 450 and the rear right lower propeller 480 generate the same thrust, a diving movement of the leg-arm-paddle composite underwater robot in front-rear direction may be realized; when the front left lower propeller 410, the front left upper propeller 420, the rear left lower propeller 450 and the rear left upper propeller 460 cooperate with each other, a leftward movement of the leg-arm-paddle composite underwater robot in front-rear direction may be realized; when the front right upper propeller 430, the front right lower propeller 440, the rear right upper propeller 470 and the rear right lower propeller 480 cooperate with each other, a rightward movement of the leg-arm-paddle composite underwater robot in front-rear direction may be realized; when the rotation speeds of the front right upper propeller 430, the front right lower propeller 440, the rear left lower propeller 450 and the rear left upper propeller 460 are larger than the rotation speeds of the front left lower propeller 410, the front left upper propeller 420, the rear right upper propeller 470 and the rear right lower propeller 480, a clockwise rotation of the leg-arm-paddle composite underwater robot in front-rear direction may be realized; when the rotation speeds of the front right upper propeller 430, the front right lower propeller 440, the rear left lower propeller 450 and the rear left upper propeller 460 are smaller than the rotation speeds of the front left lower propeller 410, the front left upper propeller 420, the rear right upper propeller 470 and the rear right lower propeller 480, a counter-clockwise rotation of the leg-arm-paddle composite underwater robot in front-rear direction may be realized.

Thus, when the floating movement of the leg-arm-paddle composite underwater robot in water is realized, the forward, backward, leftward, rightward, floating, diving and rotation movements are realized quickly and accurately, so as to meet the requirements for subsea operations, thereby having widened applicability and enhanced practicability.

Figure 13:
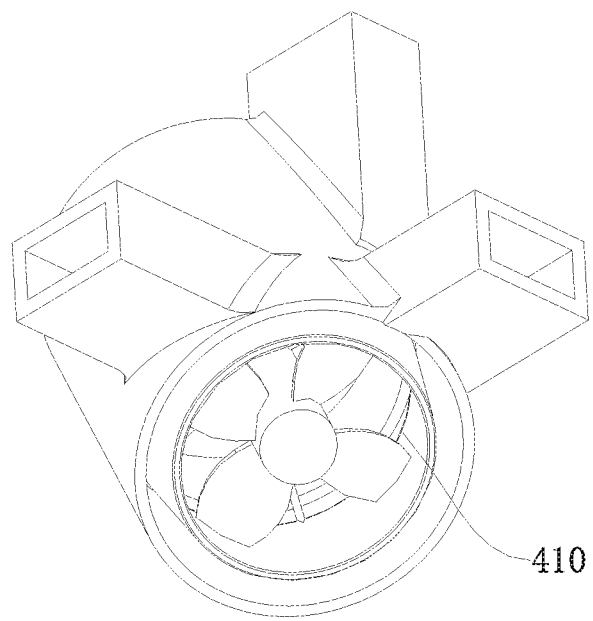
FIG. 13 is a structural diagram of an embodiment of spiral propeller of the leg-arm-paddle composite underwater robot in the present invention.

With reference to FIG. 13, the frame 1 has a cuboid pipe rack structure, and the eight spiral propellers are respectively located on the vertices of the cuboid pipe rack structure; each of the spiral propellers is fixedly connected with three mounting tubes, any two of the three mounting tubes are vertically disposed, and the three mounting tubes are fixedly connected to three pipe racks at the vertices of the spiral propellers.

As a result, the eight spiral propellers are fixedly connected to the frame 1 as a whole, which saves installation space, so that the leg-arm-paddle composite underwater robot has reduced volume, and enhanced practicality.

In the above embodiments, the leg-arm-paddle composite underwater robot further includes a control tank 5, and the control tank 5 is disposed within the frame 1; the control tank 5 is sealed, and the control tank 5 is suitable for mounting components such as a control circuit board and a power source, so that water may be prevented from flowing into the control tank 5 to burn out the circuit board.

In the above embodiments, the frame 1 further includes a mounting frame, and the mounting frame is located inside the frame 1 for being suitable for mounting the drivers of the traveling foot 310, so that the third mounting frame has a small size, high processing accuracy, and small installation error, and may also protect the drivers of the traveling foot 310, with high practicability.

In the above embodiments, each of the drivers uses a conventional torque motor series harmonic reducer.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:
1. A leg-arm-propeller underwater robot, comprising:
a frame (1), an operating mechanism (2), a traveling mechanism (3) and a propulsion mechanism (4);
wherein the traveling mechanism (3) is adapted to enable the leg-arm-propeller underwater robot to travel;
wherein the propulsion mechanism (4) is adapted to enable the leg-arm-propeller underwater robot to float in water;
wherein the operating mechanism (2) comprises a first robot arm (210), a second robot arm (220), and a first mounting base (230), wherein the first mounting base (230) is detachably connected to the frame (1), both the first robot arm (210) and the second robot arm (220) are rotatably connected to the first mounting base (230), and rotation centers of the first robot arm (210) and the second robot arm (220) are the same;
wherein the first robot arm (210) comprises a first base (211), the second robot arm (220) comprises a second base (221), both the first base (211) and the second base (221) are rotatably connected to the first mounting base (230), and rotation centers of the first base (211) and the second base (221) are the same;
wherein the first mounting base (230) comprises a first mounting shaft (231), the first base (211) comprises a first cylinder (2111), an inner wall of the first cylinder (2111) is rotatably connected to the first mounting shaft

(231), and the second base (221) is rotatably connected to an outer wall of the first cylinder (2111).

2. The leg-arm-propeller underwater robot according to claim 1, wherein both the first robot arm (210) and the second robot arm (220) comprise a plurality of arms, and at least one of the plurality of arms of the first robot arm (210) has the same rotation surface as the arm of the second robot arm (220) so as to be suitable for realizing embracing operations.

3. The leg-arm-propeller underwater robot according to claim 1, wherein a clamping manipulator is disposed at one end of the first robot arm (210), and a cage manipulator is disposed at one end of the second robot arm (220).

4. The leg-arm-propeller underwater robot according to claim 1, wherein the traveling mechanism (3) comprises a plurality of traveling foot (310), and the traveling foot (310) comprise a first rotation base (311), a first leg (313), a second leg (314), a tenth driver (315), and an eleventh driver (316); both the tenth driver (315) and the eleventh driver (316) are mounted on the first rotation base (311) for being suitable for driving the first leg (313) and the second leg (314).

5. The leg-arm-propeller underwater robot according to claim 4, wherein the traveling foot (310) further comprise a first driving shaft (318), and both the first driving shaft (318) and the first leg (313) are rotatably connected to the first rotation base (311); the second leg (314) is rotatably connected to one end of the first leg (313) away from the first rotation base (311), the first driving shaft (318) is connected to a rotation shaft of the second leg (314) through a transmission assembly (317), and the eleventh driver (316) controls rotation of the second leg (314) by driving the first driving shaft (318).

6. The leg-arm-propeller underwater robot according to claim 5, wherein rotation centers of the first driving shaft (318) and the first leg (313) are the same.

7. The leg-arm-propeller underwater robot according to claim 1, wherein the propulsion mechanism (4) comprises at least eight spiral propellers; wherein at least four of the spiral propellers are disposed obliquely in a propelling direction, and at least four of the spiral propellers are disposed obliquely in a direction opposite to the propelling direction, the propelling direction comprising an upward direction, a downward direction, a leftward direction, a rightward direction, a forward direction, and a backward direction.

8. The leg-arm-propeller underwater robot according to claim 5, wherein the first leg (313) is provided with a third receiving portion for being suitable for receiving the second leg (314).

9. The leg-arm-propeller underwater robot according to claim 1, wherein the frame (1) is provided with a first receiving portion and a second receiving portion; the first receiving portion is suitable for receiving the operating mechanism (2); and the second receiving portion is suitable for receiving the traveling mechanism (3).

10. A leg-arm-propeller underwater robot, comprising:
a frame (1), an operating mechanism (2), a traveling mechanism (3) and a propulsion mechanism (4);
wherein the traveling mechanism (3) is adapted to enable the leg-arm-propeller underwater robot to travel;
wherein the propulsion mechanism (4) is adapted to enable the leg-arm-propeller underwater robot to float in water;
wherein the operating mechanism (2) comprises a first robot arm (210), a second robot arm (220), and a first mounting base (230), wherein the first mounting base (230) is detachably connected to the frame (1), both the first robot arm (210) and the second robot arm (220) are rotatably connected to the first mounting base (230), and rotation centers of the first robot arm (210) and the second robot arm (220) are the same;
wherein the traveling mechanism (3) comprises a plurality of traveling foot (310), and the traveling foot (310) comprise a first rotation base (311), a first leg (313), a second leg (314), a tenth driver (315), and an eleventh driver (316); both the tenth driver (315) and the eleventh driver (316) are mounted on the first rotation base (311) for being suitable for driving the first leg (313) and the second leg (314).

* * * * *